United States Patent [19]
Ciupke et al.

[11] Patent Number: 5,461,547
[45] Date of Patent: Oct. 24, 1995

[54] FLAT PANEL DISPLAY LIGHTING SYSTEM

[75] Inventors: Werner W. Ciupke; William F. Redmond; Richard E. DuNah, all of Sonoma County, Calif.

[73] Assignee: Precision Lamp, Inc., Cotati, Calif.

[21] Appl. No.: 95,753

[22] Filed: Jul. 20, 1993

[51] Int. Cl.⁶ ........................................................ F21V 8/00
[52] U.S. Cl. .......................... 362/31; 362/293; 362/327; 362/330; 362/390; 359/49
[58] Field of Search .................................. 359/40, 41, 48, 359/49, 50, 64, 70; 362/26, 27, 31, 293, 327, 330, 390

[56] References Cited

U.S. PATENT DOCUMENTS

| | | | |
|---|---|---|---|
| 2,646,637 | 7/1953 | Nierenberg et al. | 362/31 |
| 4,011,001 | 3/1977 | Moriya | 359/49 |
| 4,142,781 | 3/1979 | Baur et al. | 359/49 |
| 4,659,183 | 4/1987 | Suzawa | 359/48 |
| 4,909,604 | 3/1990 | Kobayashi et al. | 362/31 |
| 5,079,675 | 1/1992 | Nakayama | 362/31 |
| 5,278,545 | 1/1994 | Streck | 359/48 |
| 5,339,179 | 8/1994 | Rudisill et al. | 359/49 |

FOREIGN PATENT DOCUMENTS

| | | | |
|---|---|---|---|
| 123823 | 7/1985 | Japan | 359/49 |
| 5-107542 | 4/1993 | Japan | 359/48 |
| 664193 | 1/1952 | United Kingdom | 362/31 |

*Primary Examiner*—Ira S. Lazarus
*Assistant Examiner*—Alan B. Cariaso
*Attorney, Agent, or Firm*—Flehr, Hohbach, Test, Albritton & Herbert

[57] ABSTRACT

A flat panel display lighting system is disclosed wherein a thin, flat light guide has two spaced major surfaces with light introduced into one edge of the guide. Light is extracted from the light guide by the facets in a plurality of parallel microgrooves disposed to intersect the light introduced into the light guide. A liquid crystal display is placed adjacent to the light guide to be backlit or frontlit.

17 Claims, 3 Drawing Sheets

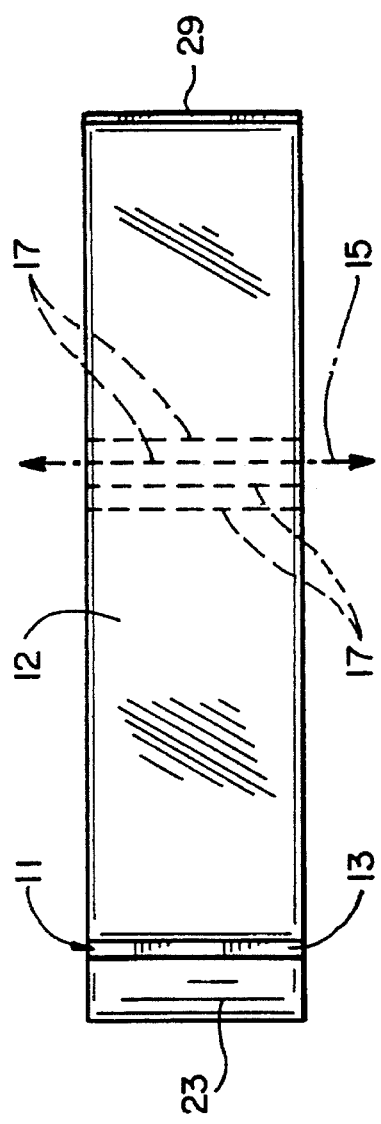
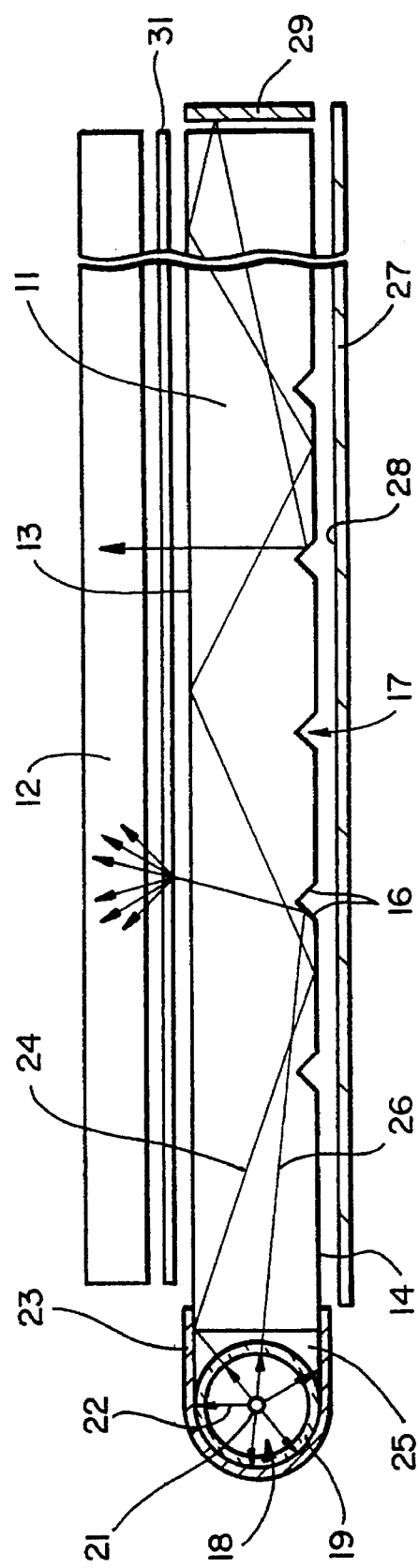

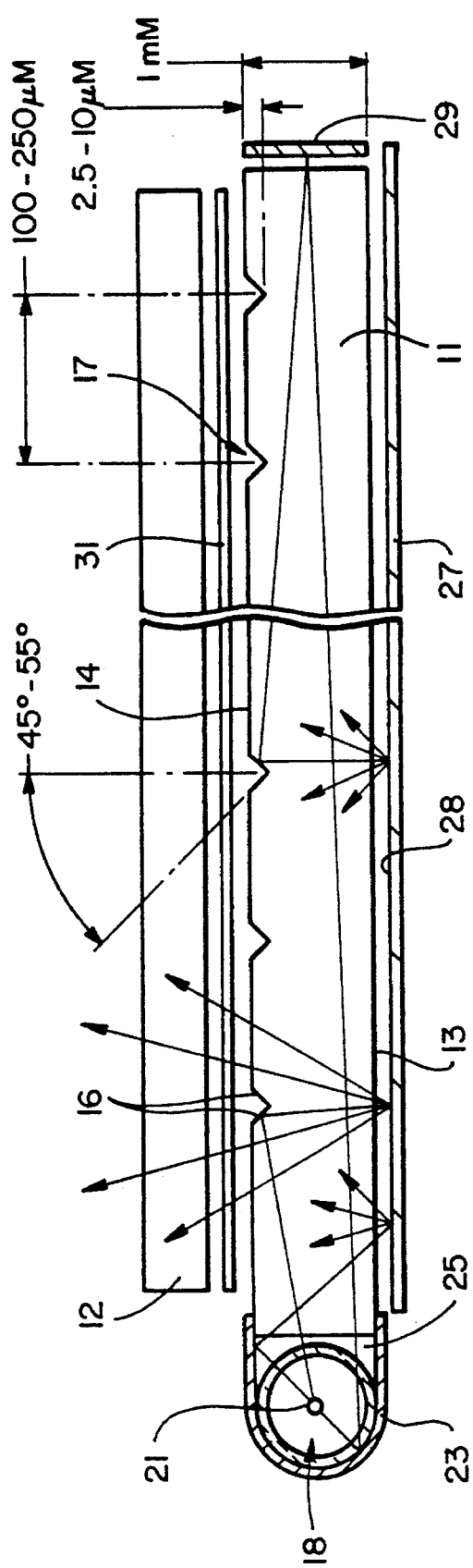
FIG_3
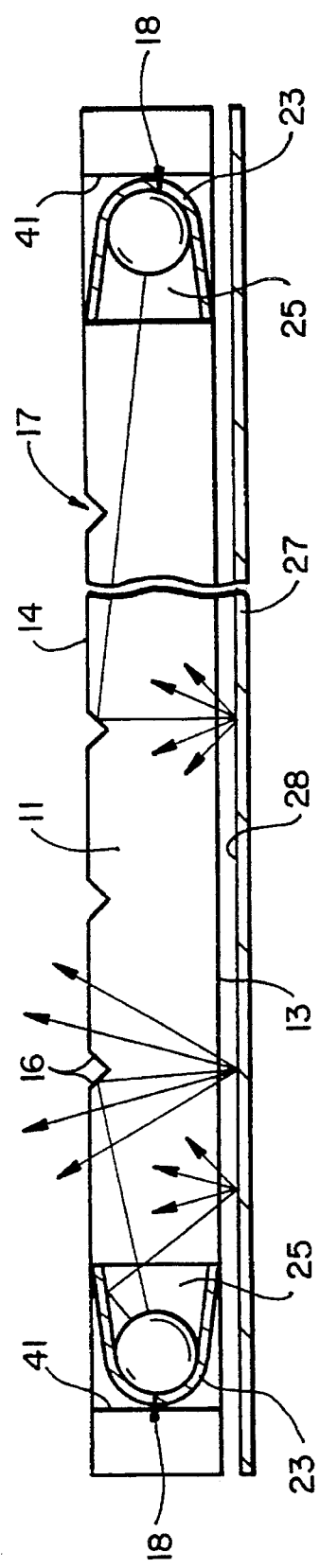
FIG_4

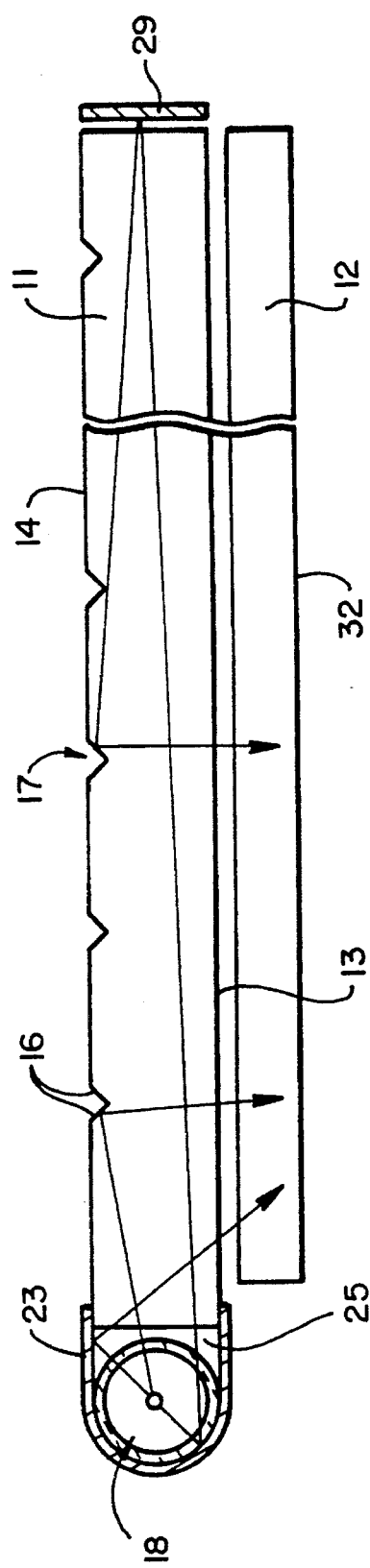
FIG_5
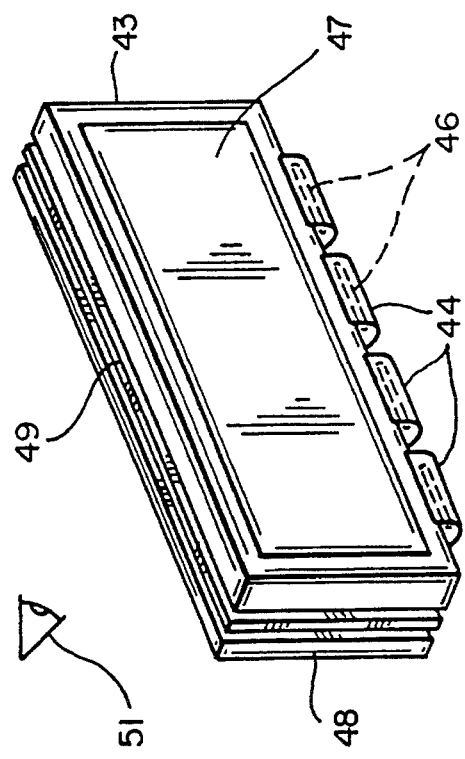
FIG_6

5,461,547

FLAT PANEL DISPLAY LIGHTING SYSTEM

BRIEF SUMMARY OF THE INVENTION

This invention relates generally to a lighting system for illuminating flat panel displays such as liquid crystal displays, and more particularly, to a system employing a thin flat light guide with microgrooves formed on one major surface for extracting light introduced into the light guide.

BACKGROUND OF THE INVENTION

Lighting systems for illuminating liquid crystal displays employing light guides with edge lit end surfaces are known. These large area lighting systems generally do not have a uniform thickness, which is undesirable in many applications, such as backlighting of liquid crystal displays (LCDs) for pagers, hand-held computers, organizers and the like. Examples of prior art light sources are described in the following patents:

U.S. Pat. No. 4,706,173 discloses a light reflecting apparatus that uses a lamp, probably a fluorescent lamp, with light impinging on a series of exterior reflective surfaces which reflect the light into an associated display.

U.S. Pat. No. 4,277,817 discloses two embodiments of a wedge-shaped body with a microgroove surface for emitting light from the grooved surface. The light is introduced in a direction that is generally parallel to the grooves.

U.S. Pat. No. 4,257,084 discloses a display that reflects light off an angled surface to strike a diffusing surface which has prismatic serration to extract the light.

U.S. Pat. No. 4,323,951 discloses a display having generally laminar light transmissive layers, one of which has a roughened back surface whereby light will be transmitted through a front surface of the laminar unit.

U.S. Pat. No. 4,528,617 discloses a light distribution apparatus that uses a transparent double wedge-shaped member having first internally reflecting surfaces to reflect a curtain of light to a second surface which has internally reflecting surfaces which reflect the light to an opposite surface for illuminating a generally rectangular area whereby to backlight an LCD display.

U.S. Pat. No. 5,050,946 discloses a light pipe that has a planar front surface for back-lighting LCDs. Light is injected into the light pipe from the ends. The back surface has a series of planar portions parallel to the front surface connected by facets, which are angled so that the injected light reflects off the facets through the front surface. A reflector having a planar, highly reflective, highly scattering surface or a sawtoothed or grooved reflecting surface is placed adjacent to facets.

U.S. Pat. No. 5,126,882 discloses a light pipe in which light emitted from a surface strikes a prism member which causes the light to be directed in a predetermined direction.

OBJECTS AND SUMMARY OF THE INVENTION

It is an object of this invention to provide a thin, uniform thickness large area lighting system for lighting flat displays, particularly liquid crystal displays.

It is another object of the invention to provide a thin, uniform thickness large area lighting system employing internal reflection of light introduced into the edge of a light guide to provide substantially uniform emission of light from a major surface.

It is a further object to provide a thin, uniform thickness large area lighting system for front-lighting liquid crystal displays.

It is a further object to provide a lighting system having an injection-modable, low cost light guide.

The foregoing and other objects are achieved by a thin, flat, transparent light guide having a first planar major surface and a second parallel major surface which has a plurality of closely spaced parallel microgrooves whose surfaces internally reflect light introduced into the light guide in a direction substantially perpendicular to the direction of the axis of the grooves toward the other major surface, where it is emitted from the surface.

BRIEF DESCRIPTION OF THE DRAWINGS

The foregoing and other object of the invention will be more fully understood from the following description, read in connection with the accompanying drawings, where:

FIG. 1 is a plan view of a back light LCD illuminated by a light pipe in accordance with one embodiment of the invention.

FIG. 2 is a greatly enlarged cross-sectional view of the embodiment of FIG. 1.

FIG. 3 is a greatly enlarged cross-sectional view of a large area lighting system in accordance with another embodiment of the invention.

FIG. 4 is an enlarged cross-sectional view of another embodiment of a backlighting system incorporating two light sources.

FIG. 5 is an enlarged cross-sectional view of a large area lighting system in accordance with the invention, which is front-lighting an LCD.

FIG. 6 shows a backlit transmissive LCD assembly in accordance with another embodiment of the invention.

DESCRIPTION OF PREFERRED EMBODIMENT

FIGS. 1 and 2 show an internally reflecting light pipe or guide 11 used for backlighting a liquid crystal display (LCD) 12. The light pipe includes one planar surface 13 and an opposite light extracting surface 14 created by facets 16 created by grooves 17. The v-shaped grooves 17 extending across the surface 14 having a longitudinal axis 15. FIG. 3 shows that typical v-groove depths are 2.5–10 μm, and the spacing between v-grooves is 100–250 μm. As will become apparent, the spacing between grooves may be varied along the length of the light pipe to provide improved uniformity of the light emitted from the light along the length of the light guide. The internally reflecting light pipe has v-grooves whose facets make an angle with respect to a direction perpendicular to the light pipe which is typically 45–55 degrees. In one flat panel display lighting system, the thickness of the light pipe was one millimeter, which matched the dimensions of the miniature incandescent light sources which edgelit the light guide. In general, we have found that the light guide or pipe provides the best lighting efficiency when it has a thickness which is the same or greater than the dimension of the light source. A typical light source 18 includes a cylindrical envelope 19 which houses a co-axial filament 21. The filament radiates light in all directions as indicated by the arrows 22. A U-shaped reflector 23 which may comprise a thin sheet of reflective material encloses the lamp and reflects the energy into the light pipe in a plurality of directions. Preferably, the space between the incandescent lamp, the light pipe and the reflector is filled with a transparent, flexible, refractive index matching material 25 which holds the lamp and cushions it from any shock and efficiently couples the light from the source into the light pipe. The index matching material may be tinted to provide a colored lighting system. The light, which is directed in a direction generally perpendicular to the longitudinal axis 15 of the v-grooves into the end of the light pipe, reflects off the planar surfaces and off of the facets as shown generally by the rays 24 and 26. A reflector 27 with reflecting surface 28 is placed adjacent to the faceted surface and reflects any light which escapes from this surface back into the light pipe and toward the surface 13. The end of the light pipe is provided with a reflector 29 which reflects any light traveling through the light pipe back into the light pipe to further increase the efficiency of conversion of light from the incandescent source for backlighting the LCD. As is apparent, light rays eventually strike the facets and are extracted at the surface 13. A diffuser or brightness enhancing film 31 receives the emitted light and diffuses the light so that light of relatively uniform intensity strikes the back of the LCD. In instances where the LCD 12 is provided with a suitable transflective coating, the diffuser may be eliminated and the LCD placed directly on the planar surface. The efficiency can be improved by coating the facets 16 with a reflective material to assure that all rays striking the facets are reflected and not transmitted to the adjacent reflector.

FIG. 3 shows another embodiment of the invention in which the reflecting surface 28 is placed adjacent to the planar surface 13 of the light pipe and the LCD receives light from the grooved surface 14. The light reflected by the facets through the planar surface 13 is reflected back into and through the light pipe by the back-reflecting surface 28, as indicated. In other respects, the construction of the embodiment of FIG. 3 is identical to that of FIGS. 1 and 2, and like reference numbers have been applied to like parts.

In instances where more light is required, light sources may be placed at each end of the light pipe, as illustrated in FIG. 4. In FIG. 4, the light pipe is provided with an opening 41 which receives the reflector 23 and the light source 18. The volume within the reflector is filled with a transparent, resilient, refractive index matching material to protect the light source against shock and efficiently couple the light into the guide. The index matching material may be tinted if a colored lighting system is desired. In other respects, the lighting system shown in FIG. 4 operates similar to that shown in FIG. 3, and like reference numbers have been applied to like parts.

We have found that efficiency of the lighting of certain LCDs can be improved if the LCD is illuminated from the front. This is illustrated in FIG. 5, where the LCD is placed adjacent to the planar surface 13, and the light reflected by the facets and exiting the surface strikes the LCD directly. In this instance the LCD, which has a totally reflective back surface 32, is viewed through the thin transparent light pipe. Operation of the light pipe to extract light is as described above and like reference numerals have been applied to like parts.

We have also found that for backlit displays, the illumination can be improved if the LCD transflective backcoating is removed to produce a transmissive LCD and a light diffuser is placed between the light pipe and the LCD. The diffuser not only diffuses the light emitted by the light pipe, but also acts in conjunction with the back reflector 27 to enhance viewing of the LCD under ambient conditions.

The display lighting system shown in the figures includes a long, narrow light pipe or light guide with a light source at one or both ends. It is, of course, apparent that the light guide may have different shapes and that the source of light may be located along an edge of the guide rather than the end, with the longitudinal axis of the v-grooves extending generally perpendicular to the light source. The light source may include a plurality of incandescent light sources, glow discharge sources, or other types of light sources which direct light into the light guide or pipe in a direction generally perpendicular to the longitudinal axis of the v-grooves. An assembly of this type is shown in FIG. 6.

The assembly of FIG. 6 includes a light guide 43 of the type described above, which is lit by a plurality of spaced light sources 44 including incandescent lamps 46. The light guide includes a back surface reflector 47. A transmissive LCD 48 is placed adjacent to the front surface of the light guide with a diffuser 49 placed between the light guide 43 and the LCD 48. The assembly operates as described above. The LCD is therefore backlit and viewed from the front as indicated at 51.

What is claimed:

1. A thin, large-area lighting system comprising:

a thin, transparent, rectangular light guide having first and second parallel major surfaces, said first major surface having a plurality of uniform, spaced v-shaped parallel microgrooves each extending continuously across a substantial portion of said first major surface and a plurality of planar surface portions between said microgrooves, said light guide having a uniform thickness, said microgrooves having a longitudinal axis;

means for introducing light into said light guide from at least one edge in a direction generally perpendicular to said longitudinal axis of said microgrooves, said microgrooves having surfaces which form an angle with respect to the first major surface which, when taken together with the index of refraction of the material of said light guide, internally reflects substantially all the light striking said surfaces of said microgrooves toward the second major surface at a first angle of incidence for emission from said second major surface, said planar surface portions being configured for internally reflecting a substantial portion of light striking said planar surface portions toward said second major surface at a second angle of incidence for internal reflection by said second major surface along said light guide.

2. A thin, large-area lighting system as in claim 1 including reflective means adjacent to said first major surface for reflecting light which leaves the light guide back into the light guide and toward said second major surface to enhance the emitted light intensity.

3. A thin, large-area lighting system comprising:

a thin, transparent, rectangular light guide having first and second parallel major surfaces, said first major surface having a plurality of uniform, spaced v-shaped parallel microgrooves extending continuously across a substantial portion of said first major surface and a plurality of planar surface portions between said microgrooves, said microgrooves having a longitudinal axis;

means for introducing light into said light guide from at least one edge in a direction generally perpendicular to said longitudinal axis of said microgrooves, said microgrooves having surfaces which form an angle with respect to the first major surface which, when taken together with the index of refraction of the material of said light guide, internally reflects substantially all the light within said light guide toward the second major surface at a first angle of incidence for emission from said second major surface, said planar surface portions being configured for internally reflecting a substantial portion of light striking said planar surface portions toward said second major surface at a second angle of incidence for internal reflection by said second major surface along said light guide, and reflecting means adjacent to said second major surface for reflecting light toward said first major surface where the reflected light is emitted from said first major surface between said microgrooves.

4. A thin large area lighting system as in claims 1, 2 or 3 wherein the angle formed by said microgroove surfaces is between 45–55 degrees with respect to a direction perpendicular to the first major surface.

5. A lighting system as in claim 4 wherein the grooves microgrooves are equally spaced.

6. A thin, large-area lighting system as in claim 1 in which the light guide material is tinted for the desired light color.

7. A lighting system as in claims 1, 2 or 3 wherein the thickness of the light guide is approximately 1 mm and the depth of the microgrooves is between 2.5–10 μm with the spacing between microgrooves between 100–250 μm.

8. A lighting system as in claims 1, 2 or 3 wherein said means for introducing light into said light guide comprises:

an elongated, incandescent lamp adjacent to said one edge, a reflector extending from the edge of the light guide around said incandescent lamp to reflect light from said lamp into the light guide, and a flexible transparent material substantially filling the space between said lamp, said reflector and the edge of said light guide serving to cushion the lamp against shock and efficiently couple the light into the light guide.

9. A lighting system as in claim 8 wherein the flexible transparent material is tinted to provide colored light.

10. An illuminated LCD system including a thin, large-area lighting system comprising:

a thin, transparent, rectangular light guide having first and second parallel major surfaces, said first major surface having a plurality of v-shaped parallel microgrooves extending across said first major surface, said microgrooves having a longitudinal axis;

means for introducing light into said light guide from at least one edge in a direction generally perpendicular to said longitudinal axis of said microgrooves;

said microgrooves having surfaces which form an angle with respect to the first major surface which, when taken together with the index of refraction of the material of said light guide, internally reflects substantially all the light within said light guide toward the second major surface for emission from said second major surface; and a front-lit LCD having a front surface in contact with said second major surface and a reflecting back surface which reflects light introduced into the front surface to display information in the display, whereby the display is illuminated from the front and the display information is viewed through the light guide.

11. An illuminated LCD system comprising:

a thin, transparent, rectangular light guide having first and second parallel major surfaces, said first major surface having a plurality of spaced v-shaped parallel microgrooves extending continuously across a substantial portion of said first major surface and a plurality of planar surface portions between said microgrooves, said light guide being of a uniform thickness, said microgrooves having a longitudinal axis;

means for introducing light into said light guide from at least one edge in a direction generally perpendicular to said longitudinal axis of said microgrooves;

said microgrooves having a uniform configuration with each of said microgrooves having surfaces which form an angle with respect to said first major surface which, when taken together with the index of refraction of the material of said light guide, internally reflects substantially all the light striking said surfaces of said microgrooves toward the second major surface at a first angle of incidence for emission from said second major surface;

said planar surface portions being configured for internally reflecting a substantial portion of light striking said planar surface portions toward said second major surface at a second angle of incidence for internal reflection by said second major surface along said light pipe; and a backlit LCD placed with the back surface of said LCD adjacent to said second major surface.

12. An illuminated LCD system as in claim 11 wherein a diffuser is placed between said second major surface and said LCD.

13. An illuminated LCD system as in claim 11 wherein the LCD is transmissive.

14. An illuminated LCD system as in claim 11 including reflective means adjacent to said first major surface for reflecting light which leaves the light guide back into the light guide and toward said second major surface to enhance the emitted light intensity.

15. An illuminated LCD system comprising:

a thin, transparent, rectangular light guide having first and second parallel major surfaces, said first major surface having a plurality of v-shaped parallel microgrooves extending continuously across a substantial portion said first major surface and a plurality of planar surface portions between said microgrooves, said microgrooves having a longitudinal axis;

means for introducing light into said light guide from at least one edge in a direction generally perpendicular to said longitudinal axis of said microgrooves;

said microgrooves having a uniform shape and size with each of said microgrooves having surfaces which form an angle with respect to said first major surface which, when taken together with the index of refraction of the material of said light guide, internally reflects substantially all the light within said light guide toward the second major surface at a first angle of incidence for emission from said second major surface;

said planar surface portions being configured for internally reflecting a substantial portion of light striking said planar surface portions toward said second major surface at a second angle of incidence for internal reflection by said second major surface along said light guide, and a backlit LCD placed with the back surface of said LCD adjacent to said first major surface; and reflecting means adjacent to said second major surface for reflecting light emitted from the second major surface toward said first major surface for emission from said first major surface between said microgrooves where the reflected light illuminates the LCD.

16. An illuminated LCD system as in claim 15 wherein a diffuser is placed between said first major surface and said LCD.

17. An illuminated LCD system as in claim 16 wherein the LCD is transmissive.

* * * * *